United States Patent [19]

Liu

[11] Patent Number: 5,102,306
[45] Date of Patent: Apr. 7, 1992

[54] AC/DC AIR PUMP

[76] Inventor: Kuo-Sheng Liu, No. 1, Alley 58, Lane 176, Ta Yeh St., Chia Yi City, Taiwan

[21] Appl. No.: 521,303

[22] Filed: May 8, 1990

[51] Int. Cl.⁵ .......................... F04B 35/04; H02R 3/00; H02R 23/64
[52] U.S. Cl. .................................. 417/415; 417/410; 417/423.7; 417/416; 310/179; 310/184; 310/158
[58] Field of Search ............... 417/416, 423.7, 410, 417/415; 310/179, 184, 195, 198, 158

[56] References Cited

U.S. PATENT DOCUMENTS

| | | | |
|---|---|---|---|
| 864,990 | 9/1907 | Richards et al. | 417/416 |
| 1,038,222 | 9/1912 | Smith | 417/550 |
| 1,821,071 | 9/1931 | Oswald | 310/158 |
| 1,860,728 | 5/1932 | Bindschedler | 310/158 |
| 3,754,154 | 8/1973 | Massie | 310/34 |

FOREIGN PATENT DOCUMENTS 62-71458  4/1987  Japan .................................. 310/158

Primary Examiner—Leonard E. Smith
Assistant Examiner—Alfred Basichas
Attorney, Agent, or Firm—Lowe, Price, LeBlanc & Becker

[57] ABSTRACT

An AC/DC air pump used for filling air into car tire, the housing of the air pump accomodates a driving motor with radiative fan, by applying a large gear driven by motor, and the large gear is gearing the link eccentrically to drive the piston of air cylinder for engaging in reciprocating motion so as to provide high or low pressure air-filling effect.

5 Claims, 2 Drawing Sheets

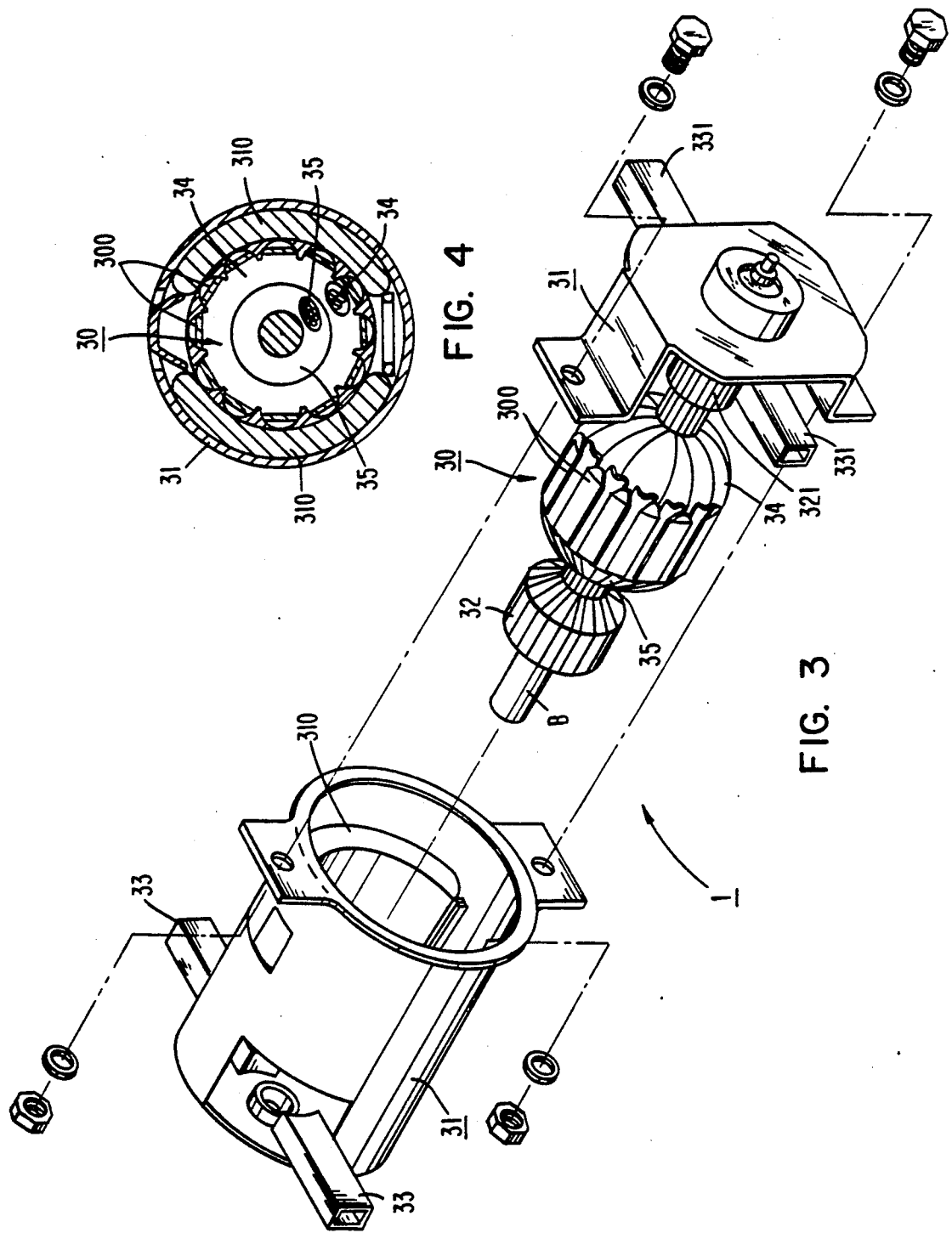

AC/DC AIR PUMP

BACKGROUND OF THE INVENTION

This invention relates to an air pump for filling air into a car tire and particularly to an improved structure of an AC/DC air pump.

Generally speaking, an air pump for a car tire is one of the most important tools necessarily prepared in the car; it mainly comprises a driving motor to gear a crank, and the crank drives the piston of an air cylinder in reciprocating motion so as to provide the effect of filling air into the tire.

Notwithstanding, the car itself uses DC power so that air pump also applies DC power for driving, i.e. uses the socket of cigarette ignitor. Therefore, air pump for a car tire prepared in the car is limited to be used for car only due to the restriction of power supply and socket but not applicable for the other fields and purposes.

SUMMARY OF THE INVENTION

The object of the invention is to provide an AC/DC air pump; under appropriate design, it can be applicable to AC or DC power supply to avoid any restriction from the place or purpose so as to increase its applicable utilities.

The other object of the invention is to provide an AC/DC air pump, wherein a driving motor of the air pump is applicable to both AC and DC power supplies, whereby the air pump is usable in the place where DC power is applied other than for car purposes only.

Still another object of the invention is to provide an AC/DC air pump motor, wherein the rotor winding (armature) of air pump driving motor and commutator are specially designed, the rotor winding comprises windings in different linear diameter, whereby the winding in greater linear diameter coaxially appears to wrap the coil in smaller diameter and both coils connect with a respective commutator, and AC or DC power supply is applicable by means of the selection of one of the rotor windings and respectively commutator.

In accordance with the invention, the housing of said pump accomodates a driving motor and gearing for a crank device and radiative fan, and said crank device drives the piston of an air cylinder in reciprocating motion to provide the function of high pressure air inflation. The rotor windings of said driving motor comprise coils with conductive wires in different linear diameters to form outer and inner rotor windings. The outer winding of greater linear diameter is packed on the rim of the inner winding of smaller linear diameter, lack winding been connected with the respective commutator. Then an AC or DC power cord is connected to a respective commutator subject to user requirements.

A more complete understanding of these and other features and advantages of the present invention will become apparent from a careful consideration of the following detailed description of certain embodiments illustrated in the accompanying drawings.

DESCRIPTION OF THE DRAWINGS

FIG. 3 is a perspective view showing the construction members of this invention.

FIG. 4 is a cross-sectional view of the embodiment of this invention.

DETAILED DESCRIPTION OF THE PREFERRED EMBODIMENT

Figure 1:
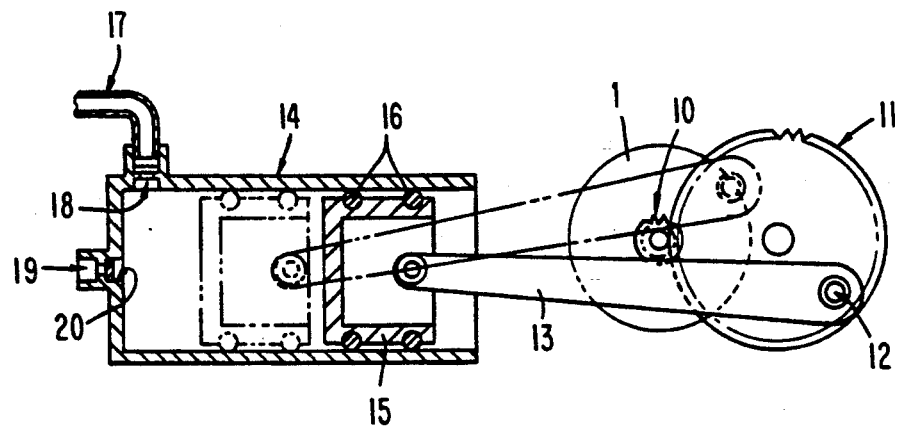
FIG. 1 is a diagram showing the motion of members in the embodiment of the invention.

Referring to FIG. 1, this invention includes a mainly driving motor 1 accomodated within the housing, the small gear 10 on the end of the rotor is in engagement with the large gear 11, a shaft post 12 is located at the eccentric position of said large gear 11, said shaft post 12 is connecting a link 13 and jointly driving the piston 15 of air cylinder 14, the air cylinder 14 including air intake 19, valve gate 20, air outlet 17 and valve gate 18, and oil seal 16 on the rim of piston 15 fitted with air cylinder tightly. As the driving motor 1 drives the large gear 11 and the eccentric shaft post 12 drives the link 13 to drive the piston 15 in reciprocating motion within the air cylinder 14, low pressure air is sucked through the air intake 19, and high pressure air will be pumped out of the air outlet 17, then the effect of high pressure air inflation being attained.

Figure 2:
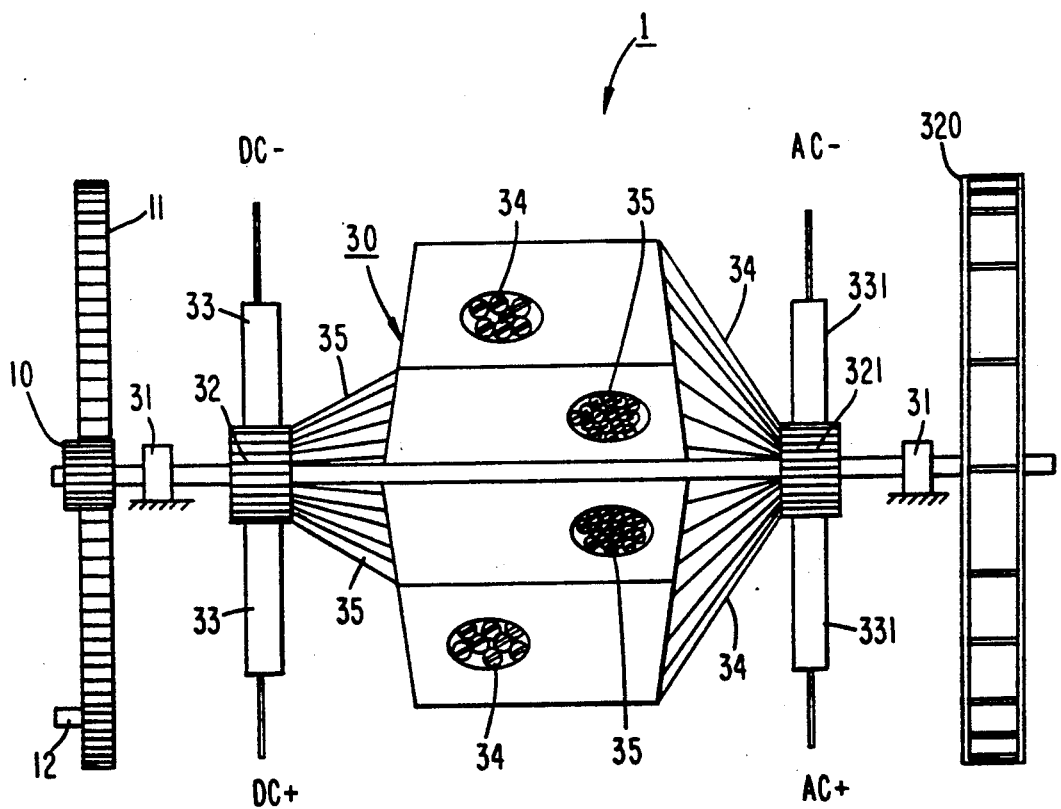
FIG. 2 is a diagram showing the structure of a rotor in the embodiment of this invention.

Referring to FIGS. 2 and 3, the driving motor 1 comprises housing stator 31 and rotor 30. At one end of rotor 30, the small gear 10 is gearing/driving the large gear 11, and at the other end of rotor 30, there is a fan 320.

The windings of rotor 30 includes the inner winding formed by coil 35 in a smaller linear diameter and connected to the commutator 32 at the leading end of rotor 30. The commutator 32 connects to a DC power cord with positive/negative poles (DC+ and DC−) by means of electric brush 33. The inner winding of smaller linear diameter is contained within the outer winding formed by coil 34 in greater linear diameter the winding 34 being connected to the commutator 321 at the rear end of rotor 30, which is in contact with the electric brush 331 for connection to an AC power cord with positive/negative poles (AC+ and AC−). The driving motor 1 whereby is applicable to DC and AC power supplies.

Referring to FIG. 4, a rotary magnetic field is thus formed between laminate core 300 on the outer edge of rotor 30 including windings in different linear diameter and magnetic pole 310 of housing stator. The rotary field developed in the rotor core by energization of either the AC outer winding or the DC inner winding interacts with the stator magnetic poles to produce motor rotation to drive the piston 15 for pumping air.

With the dual type motor 1 rotor winding, this invention is applicable to car DC power (DC power from cigarette ignitor socket) for pumping air as well as to AC power supply other than that in the car (cigaretter ignitor socket), whereby it has reached the practical use purpose as expected.

This invention is applicable to both AC and DC power supply alternatively subject to the user's requirement, whereby it provides better effect than the other devices in the prior art as well as increases practical utility.

Although the present invention has been described with a certain degree of particularity, the present disclosure has been made by way of example and changes in details of structure may be made without departing from the spirit thereof.

What is claimed is:

1. An AC/DC air pump for inflating air into a car tire or the like comprising:
   an air cylinder having a piston operable to produce a high pressure air supply; and
   a rotary electric motor for providing rotational movement about an axis of rotation and coupled to said cylinder for reciprocally driving said piston, said motor comprising a stator, a rotatable output shaft at said axis, and a rotor fixedly coupled to said output shaft;
   said rotor comprising a magnetizable core, a first driving winding wound on said core and energizable from a direct current power supply, and a second driving winding wound on said core in coaxial relationship with said first driving winding and energizable from an alternating current power supply, said first driving winding having an axial length that is coextensive with said second driving winding, wherein said first and second driving windings are in partial overlapping relationship;
   said stator comprising at least one pair of magnetic poles extending continuously along said axial length for interaction with flux produced by each of the rotor driving windings;
   whereby said motor may be connected to either said direct current power supply or said alternating current power supply to drive said air cylinder.

2. An AC/DC air pump as recited in claim 1, wherein said first driving winding is wound on said core to extend in a radial direction to a first linear diameter and said second driving winding is wound on said first driving winding to extend in a radial direction to a second linear diameter larger than said first linear diameter.

3. An AC/DC air pump as recited in claim 2, wherein a first commutator is fixed to said shaft at a first end of said rotor and a second commutator is fixed to said shaft at a second end of said rotor, said first driving winding being connected to said first commutator and said second driving winding being connected to said second commutator; and
   said first commutator is connectable with said direct current power supply through a first contact brush and said second commutator is connectable to said alternating current power supply through a second contact brush.

4. An AC/DC air pump as recited in claim 3, further comprising:
   gear means for coupling said motor to said cylinder;
   fan means mounted on said shaft for cooling said motor; and a housing
   wherein said motor, said gear means and said fan means are mounted within said housing.

5. An AC/DC air pump as recited in claim 4, further comprising crank means coupled between said gear means and said cylinder for eccentrically driving said piston.

* * * * *